United States Patent
Sugai

(10) Patent No.: US 9,081,593 B2
(45) Date of Patent: Jul. 14, 2015

(54) INFORMATION PROCESSING APPARATUS, METHOD FOR CONTROLLING SAME, INSTALLATION METHOD, AND STORAGE MEDIUM

(75) Inventor: Yousuke Sugai, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1048 days.

(21) Appl. No.: 13/126,111

(22) PCT Filed: Mar. 8, 2011

(86) PCT No.: PCT/JP2011/001348
§ 371 (c)(1),
(2), (4) Date: Apr. 26, 2011

(87) PCT Pub. No.: WO2011/111374
PCT Pub. Date: Sep. 15, 2011

(65) Prior Publication Data
US 2012/0013926 A1    Jan. 19, 2012

(30) Foreign Application Priority Data

Mar. 11, 2010  (JP) ................................ 2010-053951

(51) Int. Cl.
G06F 3/12        (2006.01)
G06F 9/445       (2006.01)
G06F 13/10       (2006.01)

(52) U.S. Cl.
CPC ............... *G06F 9/445* (2013.01); *G06F 13/10* (2013.01)

(58) Field of Classification Search
USPC .............. 358/1.13, 1.15, 407, 448, 527, 1.14, 358/1.12, 1.1; 710/12, 16; 719/321
See application file for complete search history.

(56) References Cited

U.S. PATENT DOCUMENTS

| | | | |
|---|---|---|---|
| 6,362,892 B1 * | 3/2002 | Lee et al. ...................... | 358/1.13 |
| 6,628,415 B2 * | 9/2003 | Lawrence et al. ............ | 358/1.15 |
| 6,727,998 B1 * | 4/2004 | Tomiyasu .................... | 358/1.15 |
| 7,908,609 B2 | 3/2011 | Mitsui | |
| 8,261,292 B2 * | 9/2012 | Kato ............................ | 719/321 |

(Continued)

FOREIGN PATENT DOCUMENTS

JP    2003-271340 A    9/2003
JP    2008-27006 A     2/2008

OTHER PUBLICATIONS

Microsoft Corporation, "Search technology: PnPX", Windows Hardware Developer Center, http://www.microsoft.com/japan/whdc/connect/rally/rallyPnpx.mspx, 2006.
Microsoft Corporation, "Building Deployable Device Driver Packages", Windows Hardware Developer Center, http://download.microsoft.com/download/a/f/d/afdfd50d-6eb9-425e-84e1-b4085a80e34e/DVR-T393_WH07.pptx, 2007.

(Continued)

*Primary Examiner* — Allen H Nguyen
(74) *Attorney, Agent, or Firm* — Fitzpatrick, Cella, Harper & Scinto

(57) ABSTRACT

A PC 1 recognizes a connection of the multipurpose machine 3 to the network 4, and a first driver, which corresponds to information equipment provided by the recognized device, is installed on the PC 1. The PC 1 acquires a supplement installer that installs a second driver, which enables the functions of the device to be used, on the PC 1 from the IHV Web server 100 upon installation of the first driver on the PC 1. Then, the supplement installer determines whether or not the second driver needs to be installed on the PC 1. When the second driver needs to be installed on the PC 1, the second driver is installed on the PC 1.

9 Claims, 19 Drawing Sheets

(56) References Cited

U.S. PATENT DOCUMENTS

| | | | |
|---|---|---|---|
| 8,355,144 B2 * | 1/2013 | Lee et al. | 358/1.13 |
| 2005/0200889 A1 * | 9/2005 | Oomura | 358/1.15 |
| 2007/0086052 A1 * | 4/2007 | Furuya | 358/1.15 |
| 2007/0136485 A1 * | 6/2007 | Mitsui | 709/230 |
| 2008/0034127 A1 * | 2/2008 | Nishio | 710/11 |
| 2009/0213416 A1 * | 8/2009 | Ishigure | 358/1.15 |

OTHER PUBLICATIONS

Microsoft Corporation, "Windows Rally Technology", http://www.microsoft.com/japan/windows/marketplace/rally/rallyfeatures.aspx, 2008.

Microsoft Corporation, "FinishInstall action of information equipment for Windows Vista", https://www.microsoft.com/japan/whdc/driver/install/Finish_Install.mspx, 2010.

* cited by examiner

Fig. 2-A
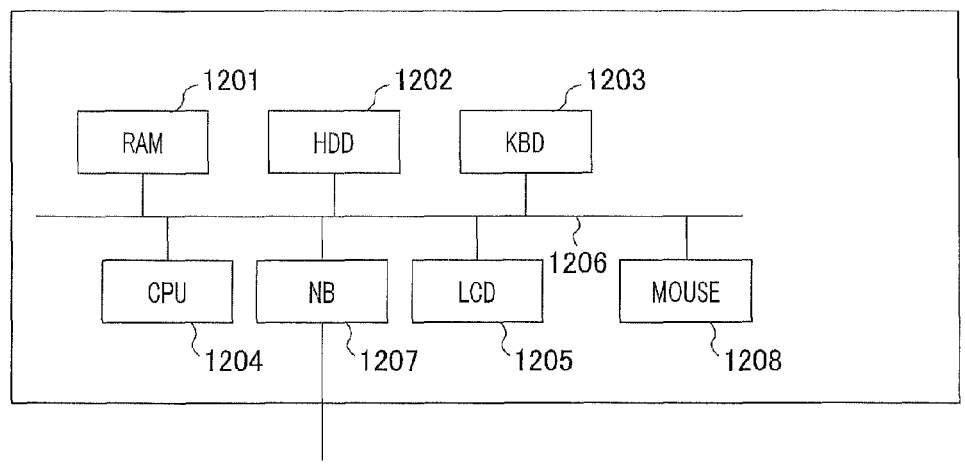
Fig. 2-B
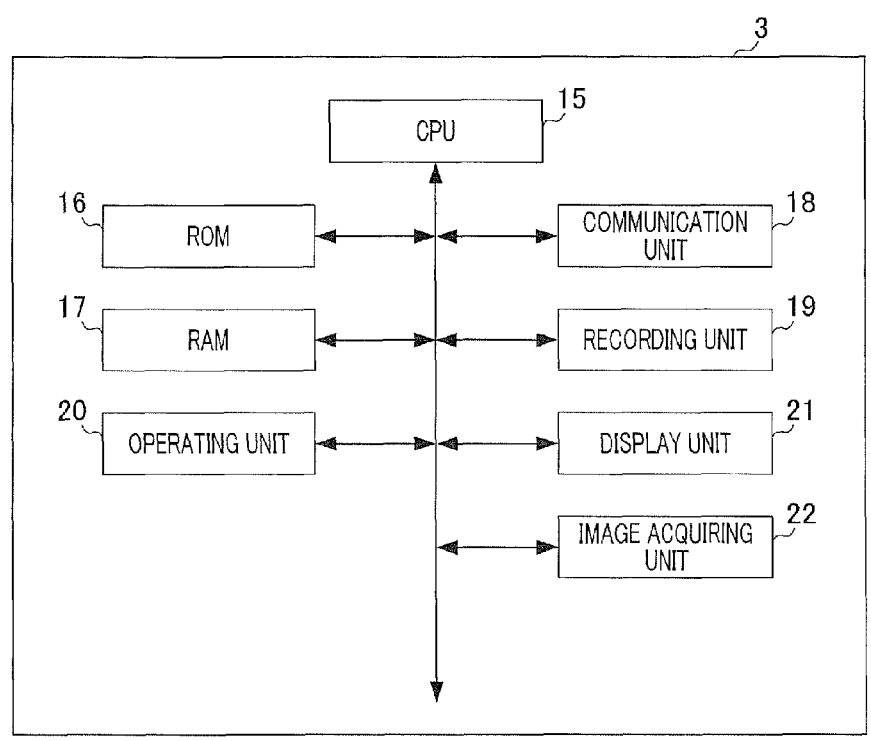

Fig. 3
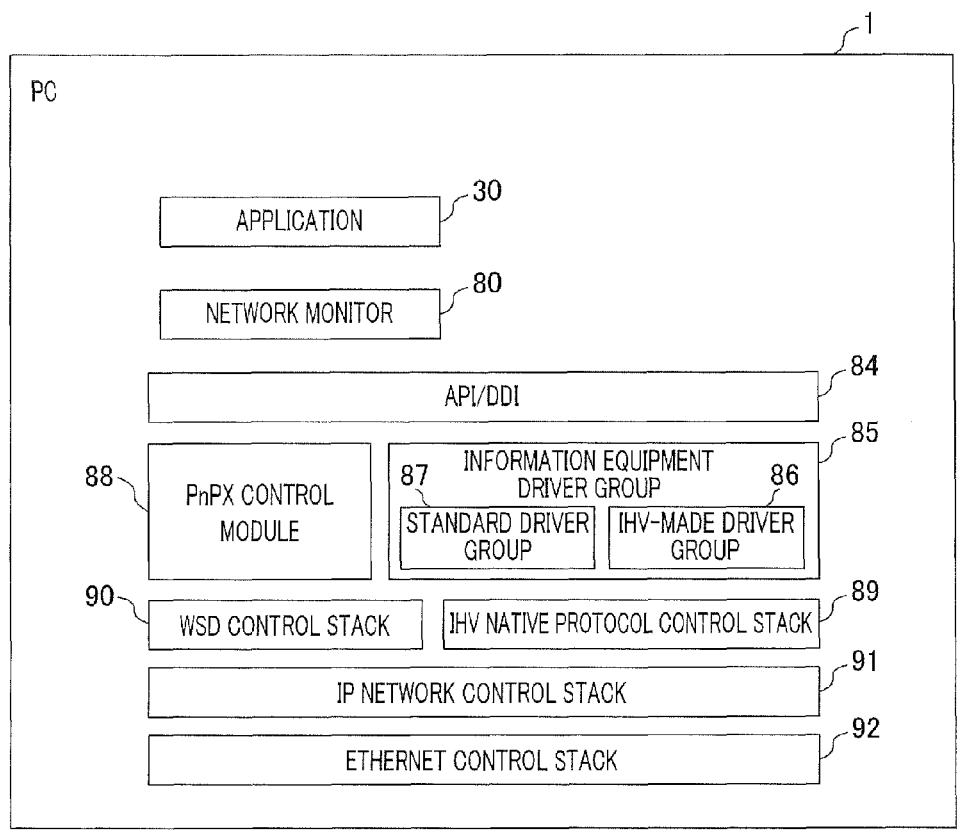
Fig. 4-A
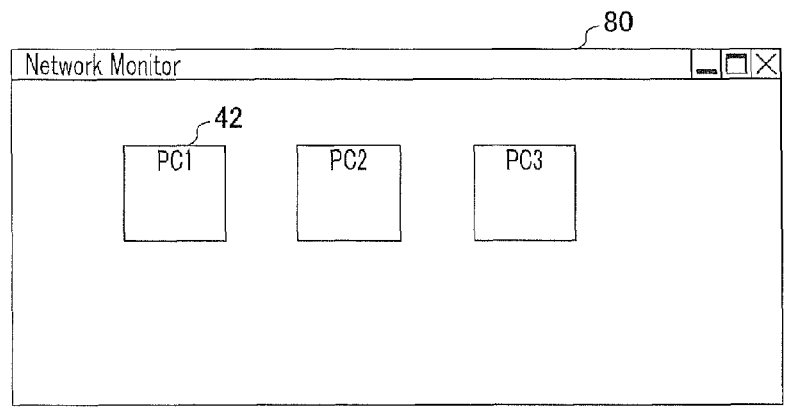

Fig. 4-B
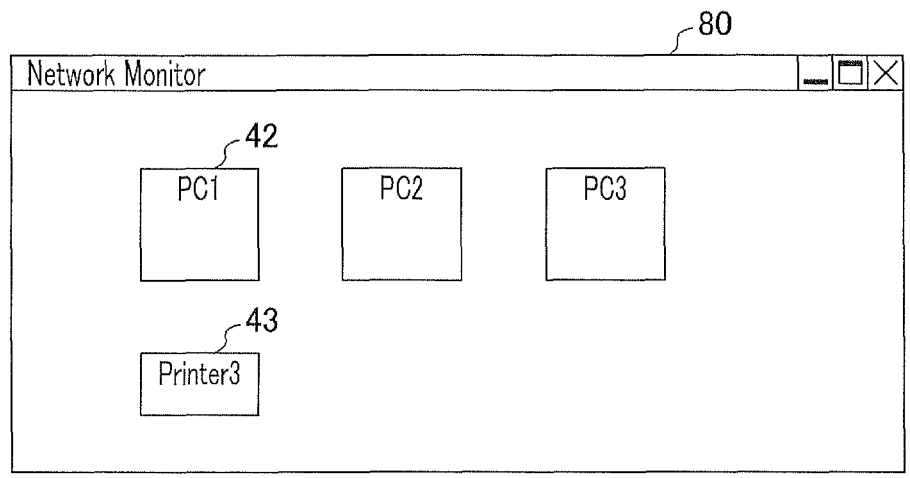
Fig. 4-C
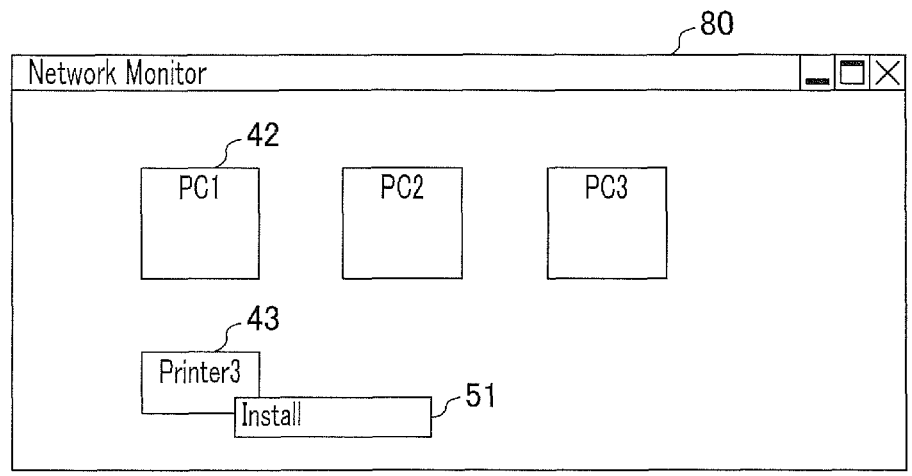

Fig. 5

```
<?xml version=" 1.0"?>
<env:Envelope xmlns:env="http://www.w3.org./2003/05/soap-envelope"
xmlns:wsa="http://schemas.xmlsoap.org/ws/2004/08/addressing"
xmlns:disc="http://schemas.xmlsoap.org/ws/2005/04/discovery">
<env:Header>
<wsa:Action>http://schemas.xmlsoap.org/ws/2005/04/discovery/Hello</wsa:Action>
<wsa:MessageID>%MESSAGE_ID%</wsa:MessageID>
<wsa:To>%TO%</wsa:To>
<disc:AppSequence InstanceId="%INSTANCE_ID%" />
</env:Header>
<env:Body>
<disc:Hello>
<wsa:EndpointReference>
<wsa:Address>%ADDRESS%</wsa:Address>
</wsa:EndpointReference>
<disc:MetadataVersion>75965</disc:MetadataVersion>
</disc:Hello>
</env:Body>
</env:Envelope>
```

Fig. 6

```
<?xml version="1.0" encoding="UTF-8"?>
<ENV:Envelope
 xmlns:ENV="http://www.w3.org/2003/05/soap-envelope"
 xmlns:wsa="http://schemas.xmlsoap.org/ws/2004/08/addressing"
 xmlns:wsdp="http://schemas.xmlsoap.org/ws/2006/02/devprof"
 xmlns:wprt="http://schemas.microsoft.com/windows/2006/08/wdp/print"
 xmlns:wsm="http://schemas.xmlsoap.org/ws/2004/09/mex">
 xmlns:npnp="http://schemas.xxx.yyyy/pnp/zzzz">
<Body>                                                                  ⎽90
<wsm:Metadata>
<wsm:MetadataSection Dialect="http://schemas.xmlsoap.org/ws/2006/02/devprof/ThisModel">
<wsdp:ThisModel>
<wsdp:Manufacturer xml : lang="en">ABC</wsdp:Manufacturer>
  <wsdp:ManufacturerUrl>http://www.abc.xxx/<wsdp:ManufacturerUrl>
  <wsdp:ModelName xml : lang="en">
    Printer
  </wsdp:ModelName>
  <wsdp:ModelNumber>
    C
  </wsdp:ModelNumber>
  <wsdp:ModelUrl>http://www.abc.xxx/C.html</wsdp:ModelUrl>
     <PNPX:DeviceCategory  xmlns:PNPX="http://schemas.microsoft.com/windows/pnpx/2005/10">
       Printers.Printer
     </PNPX:DeviceCategory>
  </wsdp:ThisModel>
</wsm:MetadataSection>
<wsm:MetadataSection Dialect="http://schemas.xmlsoap.org/ws/2006/02/devprof/ThisDevice">
<wsdp:ThisDevice>
<wsdp:FriendlyName xml : lang="en">C Printer Driver</wsdp:FriendlyName>
<wsdp:FirmwareVersion>1234</wsdp:FirmwareVersion>
<wsdp:SerialNumber>1234</wsdp:SerialNumber>
</wsdp:ThisDevice>
</wsm:MetadataSection>
</wsm:Metadata>
</Body>
</ENV:Envelope>
```

Fig. 7

```
<?xml version=" 1.0" encoding="UTF-8"?>
<ENV:Envelope
 xmlns:ENV="http://www.w3.org/2003/05/soap-envelope"
 xmlns:wsa="http://schemas.xmlsoap.org/ws/2004/08/addressing"
 xmlns:wsdp="http://schemas.xmlsoap.org/ws/2006/02/devprof"
 xmlns:wprt="http://schemas.microsoft.com/windows/2006/08/wdp/print"
 xmlns:wsm="http://schemas.xmlsoap.org/ws/2004/09/mex">
<Body>
<wsm:Metadata>
<wsm:MetadataSection Dialect="http://schemas.xmlsoap.org/ws/2006/02/devprof/ThisModel">     ⎫ 91
<wsdp:ThisModel>
<wsdp:Manufacturer xml : lang="en">ABC</wsdp:Manufacturer>
<wsdp:ManufacturerUrl>http://www.abc.xxx/</wsdp:ManufacturerUrl>
  <wsdp:ModelName xml : lang="en">
    Scanner
  </wsdp:ModelName>
  <wsdp:ModelNumber>
    C
  </wsdp:ModelNumber>
  <wsdp:ModelUrl>http://www.abc.xxx/C.html</wsdp:ModelUrl>
    <PNPX:DeviceCategory xmlns:PNPX="http://schemas.microsoft.com/windows/pnpx/2005/10">
      Scanners.Scanner
    </PNPX:DeviceCategory>
  </wsdp:ThisModel>
</wsm:MetadataSection>
<wsm:MetadataSection Dialect="http://schemas.xmlsoap.org/ws/2006/02/devprof/ThisDevice">
<wsdp:ThisDevice>
<wsdp:FriendlyName xml : lang="en">C Scanner Driver</wsdp:FriendlyName>
<wsdp:FirmwareVersion>567</wsdp:FirmwareVersion>
<wsdp:SerialNumber>1234</wsdp:SerialNumber>
</wsdp:ThisDevice>
</wsm:MetadataSection>
</wsm:Metadata>
</Body>
</ENV:Envelope>
```

Fig. 8-A
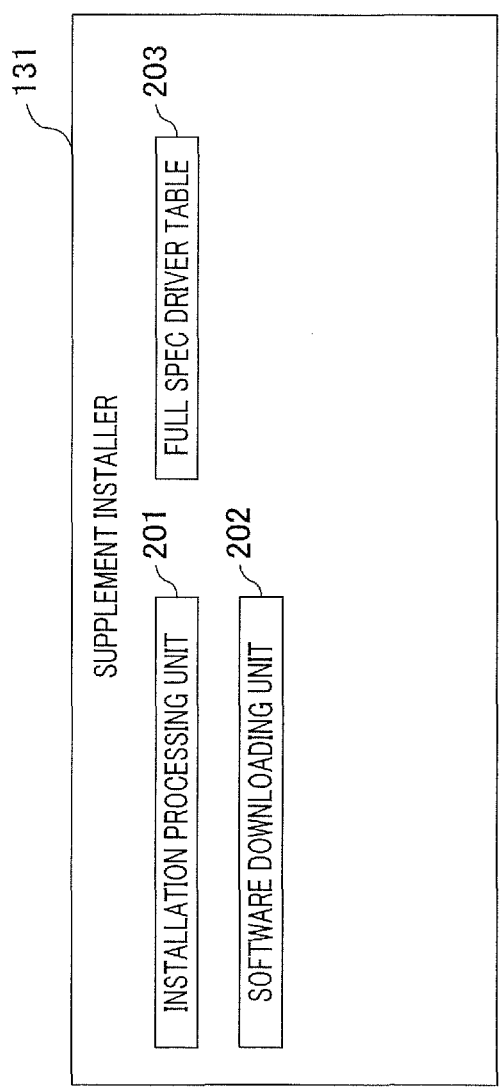

Fig. 8-B

| MACHINE NAME | DEVICE TYPE | DRIVER NAME | DOWNLOAD URL |
|---|---|---|---|
| PRINTER A | PRINTER | FULL-SPEC PRINTER DRIVER FOR PRINTER A | http://xxxxxxxxxxxxxxxxxxxx |
| PRINTER B | SCANNER | FULL-SPEC SCANNER DRIVER FOR PRINTER B | http://xxxxxxxxxxxxxxxxxxxx |
| MULTIPURPOSE MACHINE C | MULTIPURPOSE MACHINE | FULL-SPEC PRINTER DRIVER FOR MULTIPURPOSE MACHINE C | http://xxxxxxxxxxxxxxxxxxxx |
| | | FULL-SPEC SCANNER DRIVER FOR MULTIPURPOSE MACHINE C | http://xxxxxxxxxxxxxxxxxxxx |

203

Fig. 13-A
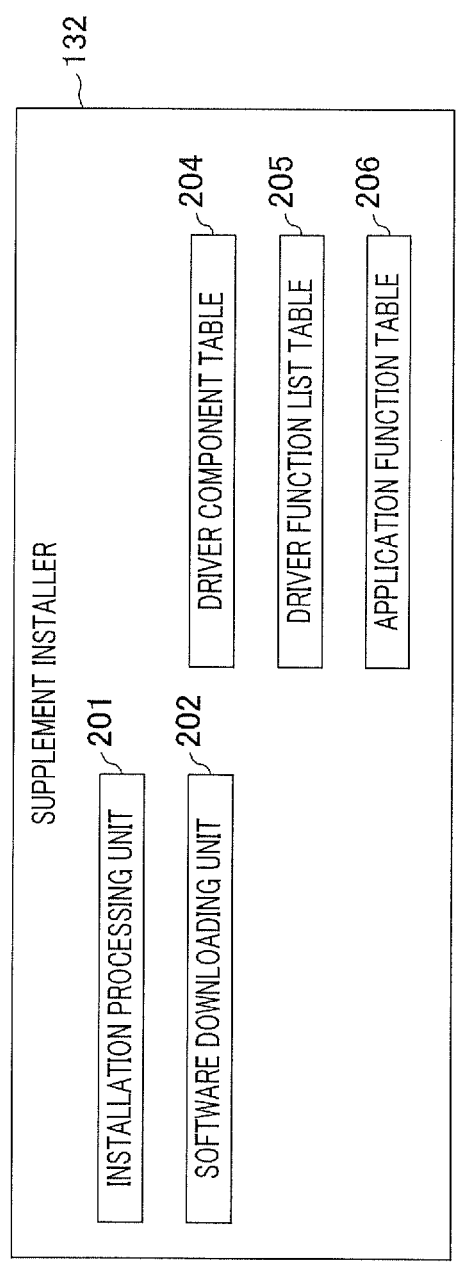

Fig. 13-B

| DRIVER COMPONENT NAME | CORRESPONDING INFORMATION | | | |
|---|---|---|---|---|
| | CORRESPONDING EQUIPMENT TYPE | CORRESPONDING DRIVER TYPE | CORRESPONDING PORT | URL |
| ABC COMPANY-MADE PRINTING PORT MONITOR | PRINTER | GDI | ABC COMPANY-MADE ORIGINAL PORT | http://xxxxxxxxxxxxxxxxxxxx |
| ABC COMPANY-MADE SCANNER PORT MONITOR | SCANNER | TWAIN | ABC COMPANY-MADE ORIGINAL PORT | http://xxxxxxxxxxxxxxxxxxxx |

| MACHINE NAME | INFORMATION EQUIPMENT TYPE | DRIVER TYPE | DRIVER NAME | OUTPUT-CAPABLE PORT | PRIORITY | URL |
|---|---|---|---|---|---|---|
| MULTIPURPOSE MACHINE C | PRINTER | GDI | FULL SPEC GDI PRINTER DRIVER FOR MULTIPURPOSE MACHINE C | LPR | 4 | http://xxxxxxxxxxxxxxxxxxxx |
| | | GDI | OS-PROVIDED GDI DRIVER FOR MULTIPURPOSE MACHINE C | WSD | 3 | http://xxxxxxxxxxxxxxxxxxxx |
| | | XPS | FULL SPEC XPS PRINTER DRIVER FOR MULTIPURPOSE MACHINE C | WSD | 2 | http://xxxxxxxxxxxxxxxxxxxx |
| | SCANNER | TWAIN | FULL SPEC TWAIN SCANNER DRIVER FOR MULTIPURPOSE MACHINE C | WSD | 2 | http://xxxxxxxxxxxxxxxxxxxx |
| | | WIA | STANDARD SCANNER DRIVER | WSD | 1 | http://xxxxxxxxxxxxxxxxxxxx |

| APPLICATION NAME | PRINCIPAL INFORMATION EQUIPMENT TYPE | PRINCIPAL DRIVER TYPE | PRINCIPAL OUTPUT PORT |
|---|---|---|---|
| PHOTO PRINT APPLICATION A | PRINTER | GDI | LPR |
| PHOTO PRINT APPLICATION B | PRINTER | — | — |
| SCAN ASSISTANCE APPLICATION B | SCANNER | TWAIN | — |

| PRINCIPAL INFORMATION EQUIPMENT TYPE | PRINCIPAL DRIVER TYPE | PRINCIPAL DRIVER PORT |
|---|---|---|
| PRINTER | GDI | LPR |
| SCANNER | TWAIN | ABC COMPANY-MADE ORIGINAL PORT |

INFORMATION PROCESSING APPARATUS, METHOD FOR CONTROLLING SAME, INSTALLATION METHOD, AND STORAGE MEDIUM

TECHNICAL FIELD

The present invention relates to an information processing apparatus, a method for controlling the same, an installation method, and a storage medium.

BACKGROUND ART

Conventionally, in order to allow information equipment to be usable in the operating system (hereinafter referred to as "OS") of a personal computer (hereinafter referred to as "PC"), a driver for the use of the information equipment on the OS must be installed on the OS. An example of a method for installing the driver includes Plug and Play Extensions (hereinafter referred to as "PnPX") (see Non-Patent Documents 1 and 2). The PnPX is a standard function that is preinstalled in the Windows (registered trademark) Vista OS and is a technology in which the OS acquires and installs a driver for the information equipment present on the network in a unique manner upon reception of a user's command. Also, in the PnPX, a scheme in which the OS finds the information equipment on the network, which is called "Web Services on Devices" (hereinafter referred to as "WSD"), is employed (see Non-Patent Document 3). Furthermore, examples of a method for causing the OS to acquire a driver when performing the PnPX include a method for acquiring a driver by searching the hard disk on the PC, a method for acquiring a driver from a Web server dedicated for the OS arranged on the internet, and the like. Note that some information equipment may have an appearance of a single information equipment but may be internally configured by a plurality of information equipment. For example, in spite of having an appearance of a single information equipment, such information equipment may internally incorporate a plurality of information equipment such as a printer, a scanner, a FAX, and the like. Such information equipment may be referred to as a "Multi Function Printer" or a "multipurpose machine".

When the PnPX occurs on the aforementioned multipurpose machine, a driver is required for each of a plurality of information equipment that is present internally. For example, in the case of a multipurpose machine in which a printer and a scanner are preinstalled, the two types of drivers, i.e., the driver for the printer and the driver for the scanner, are installed by the PnPX. Here, when taking developers and a driver distribution method mainly into consideration, a driver can be classified into three types as follows. A first type is an OS standard driver developed by an OS development company such that the minimum function of information equipment can be employed. This OS standard driver is available for many of the general information equipment such as a printer, a FAX, and the like. A second type is a full specification driver uniquely developed by information equipment development company (THY) such that all of the functions of information equipment can be employed on the OS. IHV is an abbreviation for Independent Hardware Vendor. In general, since only the minimum necessary functions for information equipment are preinstalled among the standard OS drivers, any unique functions packaged in information equipment by each IHV cannot be employed. Hence, it is desirable that a full specification driver be installed. However, in general, a user needs to search and obtain a full specification driver by himself, and thus considerable time and labor are required. Also, it may be difficult for a user to know how to acquire a full specification driver. Furthermore, in the case of a multipurpose machine, a plurality of drivers needs to be acquired depending on the number of the preinstalled information equipment, which may be difficult to be understood by a general user. A third type is an OS-provided driver provided from the IHV to the OS development company in order to solve the problem that the aforementioned user has difficulty in acquiring a full specification driver. The OS development company stores the provided OS-provided driver in a location where the OS can recognize, whereby the OS can install an IHV-made OS-provided driver upon execution of the PnPX.

A limitation is often placed on the OS-provided driver. A representative example of such limitation includes a capacity limitation. The OS-provided driver is often stored mainly on the hard disk of the PC or is often stored on the Web server dedicated for the OS arranged on the internet. However, if the IHV-made full specification drivers for all kinds of the information equipment are stored on the hard disk or the Web server dedicated for the OS, a very large amount of capacity is required, resulting in a great burden on the PC or the Web server. Hence, a limitation may be placed on the capacity of a driver. To satisfy the capacity limitation, some of the functions of the OS-provided driver may be deleted compared with those of the full specification driver. Thus, installation of the OS-provided driver may cause a problem in that a user cannot use all of the functions of the information equipment. In order to deal with the problem, a technique in which the OS downloads and installs a full specification driver by executing the PnPX module developed by the IHV has been proposed. For example, Patent Document 1 discloses a program that determines that either the performance information for a printer discovered by the WSD module or the performance information for a printer currently installed has a higher priority and installs a driver in accordance with the determination result.

CITATION LIST

Patent Literature

PTL 1: Japanese Patent Laid-Open No. 2008-27006

Non-Patent Literature

NPL 1: Microsoft Corporation, "Search technology: PnPX", [online], Windows Hardware Developer Center, Internet URL: (http://www.microsoft.com/japan/whdc/connect/rally/rallyPnpx.mspx)

NPL 2: Microsoft Corporation, "Building Develoyable Device Driver Package" [online], Windows Hardware Developer Center, Internet URL: http://download.microsoft.com/download/a/f/d/afdfd50d-6eb9-425e-84e1-b4085a80e34e/DVR-T393_WH07.pptx>

NPL 3: Windows Rally Technology, Internet URL: http://www.microsoft.com/japan/windows/marketplace/rally/rallyfeatures.aspx As described above, it is difficult for a user to search and obtain a full specification driver for a device by himself. Also, in the technique disclosed in Patent Document 1, a user needs to obtain an IHV-made PnPX module separately instead of searching the full specification driver by himself. However, it is difficult for a user to recognize how and where the IHV-made PnPX module is obtained.

SUMMARY OF INVENTION

The information processing apparatus of the present invention installs a driver, which enables the function of a device to be used, upon execution of the PnPX for the device connected to a network.

According to an aspect of the present invention, an information processing apparatus is provided that includes a device recognition unit configured to recognize a connection of a device to a network via the network; and a first installation unit configured to install a first driver, which corresponds to information equipment provided by the device, on an information processing apparatus when a connection of the device to the network is recognized, wherein the first installation unit acquires a second installation unit configured to install a second driver, which enables the functions of the device to be used, on the information processing apparatus via the network upon installation of the first driver on the information processing apparatus, and wherein the second installation unit determines whether or not the second driver needs to be installed on the information processing apparatus, and when the second driver needs to be installed on the information processing apparatus, installs the second driver on the information processing apparatus via the network.

Further features of the present invention will become apparent from the following description of exemplary embodiments with reference to the attached drawings.

BRIEF DESCRIPTION OF DRAWINGS

FIG. 2-A is a diagram illustrating an example of the hardware configuration of a PC.

FIG. 2-B is a diagram illustrating an example of the hardware configuration of a multipurpose machine.

FIG. 3 is a diagram illustrating an example of the software configuration of a PC.

FIG. 4-A is a diagram illustrating an example of the screen displayed by an NM.

FIG. 4-B is a diagram illustrating an example of the screen displayed by an NM.

FIG. 4-C is a diagram illustrating an example of the screen displayed by an NM.

FIG. 5 shows an example of the WSDiscovery message.

FIG. 6 is a diagram illustrating information about information equipment, which is to be issued upon execution of the PnPX.

FIG. 7 is a diagram illustrating information about information equipment, which is to be issued upon execution of the PnPX.

FIG. 8-A is a diagram illustrating an example of the configuration of a supplement installer.

FIG. 8-B is a diagram illustrating an example of the full specification driver table.

FIG. 13-A is a diagram illustrating an example of the configuration of a supplement installer.

FIG. 13-B is a diagram illustrating an example of the configuration of a driver component table.

FIG. 14-A is a diagram illustrating an example of the driver function list table.

FIG. 14-B is a diagram illustrating an example of the application function table.

FIG. 16 is a diagram illustrating an example of a principal function table.

DESCRIPTION OF EMBODIMENTS

Hereinafter, preferred embodiments of the present invention will now be described with reference to the accompanying drawings. Note that the present embodiments are not intended to limit the present invention. Also, all of the combinations of the features described in the present embodiments are not necessarily the principal components of the present invention. Further, among the technologies relating to Windows (registered trademark) Vista OS cited below, the technology not specifically described is disclosed in http://msdn.microsoft.com/ja-jp/default.aspx.

Figure 1:
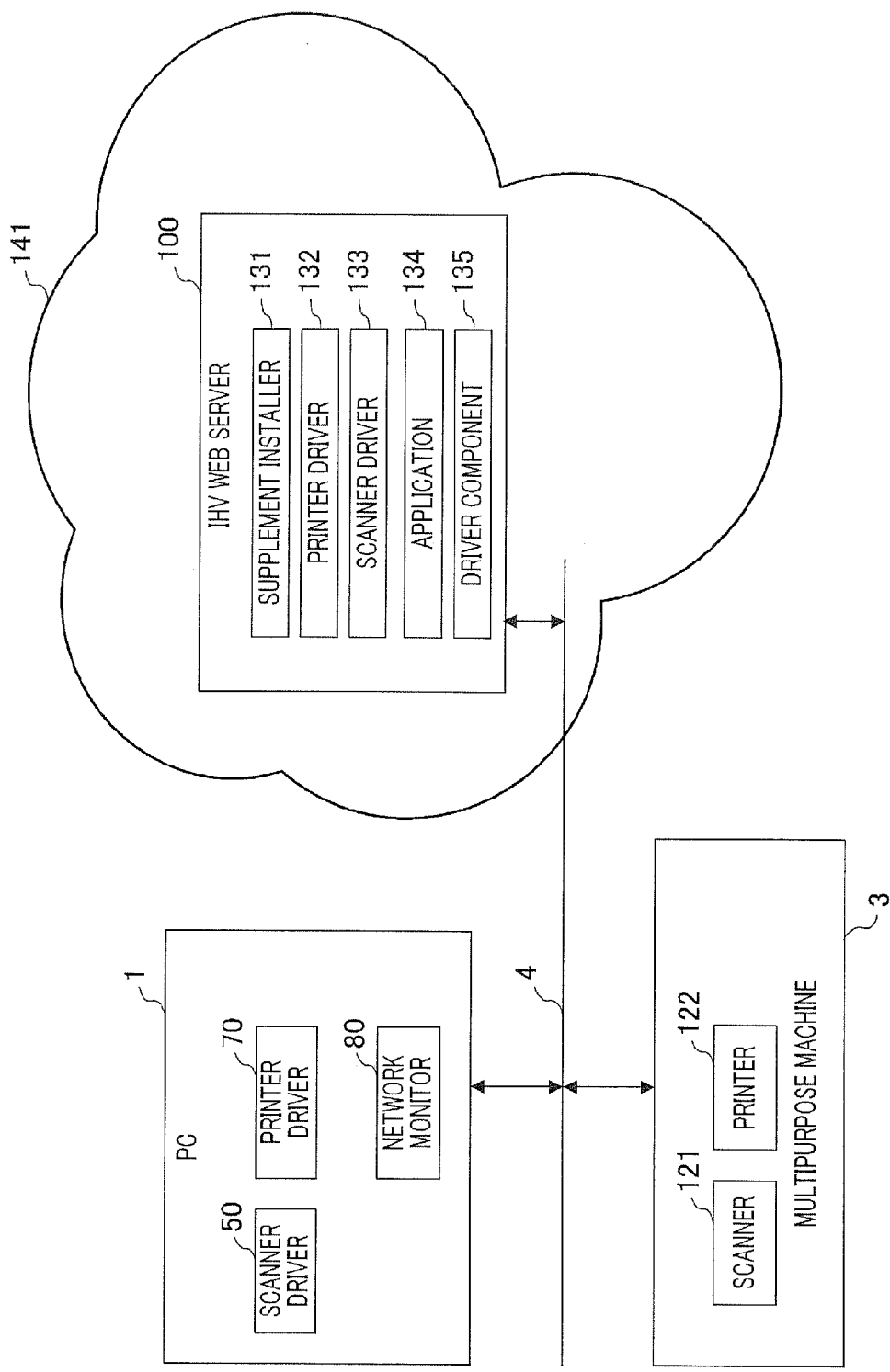
FIG. 1 is a diagram illustrating an example of the system configuration of a first embodiment.

FIG. 1 is a diagram illustrating an example of the system configuration according to a first embodiment. A system shown in FIG. 1 includes a PC (Personal Computer) 1, a multipurpose machine 3, and an IHV Web server 100. The PC 1, the multipurpose machine 3, and the IHV Web server 100 are mutually connected via a network 4. The network 4 is configured by, for example, Ethernet (registered trademark). The PC 1 is the information processing apparatus according to the present embodiment. The PC 1 has a hardware configuration to be described below with reference to FIG. 2-A, and an OS, for example, the OS equivalent to Windows (registered trademark) Vista developed by Microsoft Corporation of USA, is installed on the PC 1. In the example shown in FIG. 1, the PC 1 includes a scanner driver 50, a printer driver 70, and a network monitor 80. The printer driver 70 is a program for using the function of a printer 122 provided in the multipurpose machine 3. The scanner driver 50 is a program for using the functions of a scanner 121 provided in the multipurpose machine 3. A network monitor (NM) 80 is a program for displaying a device (e.g., the multipurpose machine 3) or a PC other than the PC 1, or the like, which is connected to the network 4.

The multipurpose machine 3 is the device of the present embodiment, and includes the printer 122 and the scanner 121 as the information equipment. The multipurpose machine 3 is, for example, a multipurpose machine having a model name C developed by XXX Corporation. The device of the present embodiment may include any information equipment (e.g., copying machine, facsimile, digital camera, and the like) other than the printer 122 and the scanner 121. The multipurpose machine 3 is configured by a hardware to be described below with reference to FIG. 2-B, and is bidirectionally communicably connected to the PC 1 via the network 4. The IHV Web server 100 is provided on a Web 141. The IHV Web server 100 is a Web server that is utilized or managed by information equipment development company WO. Instead of the IHV Web server 100, the system of the present embodiment may include any server that can provide a software requested by an information processing apparatus to the information processing apparatus such as the PC 1 or the like via the network 4. The hardware configuration of the PC 1 shown in FIG. 1 is the same as that of the PC 1 shown in FIG. 2-A. For the information equipment developed by IHV, the IHV Web server 100 includes a supplement installer 131, a printer driver 132, a scanner driver 133, an application 134, and a driver component 135.

FIGS. 2-A and 2-B are diagrams illustrating an example of the hardware configuration of a PC and a multipurpose machine, respectively. FIG. 2-A is a diagram illustrating an example of the hardware configuration of the PC 1. The PC 1 includes a random access memory (RAM) 1201, a hard disk drive (HDD) 1202, a keyboard (KBD) 1203, and a mouse (MOUSE) 1208. The PC 1 further includes a CPU (Central Processing Unit) 1204, a LCD (Liquid Crystal Display) 1205, and a network board (NB) 1207. The CPU 1204 controls the PC 1 overall. More specifically, the CPU 1204 reads out the computer program stored in an HDD on the RAM 1201 to thereby execute the computer program. The computer program is a program that realizes a method for controlling an information processing apparatus according to the present embodiment. Instead of the HDD 1202, the PC 1 may include a mobile CD-ROM, an internally-provided ROM (Read Only Memory), or the like. Information depending on a user's operation is input using the KBD 1203 and the MOUSE 1208. The NB 1207 controls communication between the PC 1 and the multipurpose machine 3. The components provided in the PC 1 shown in FIG. 2-A are connected to each other via a bus 1206.

FIG. 2-B is a diagram illustrating an example of the hardware configuration of the multipurpose machine 3. The multipurpose machine 3 includes a CPU 15, a ROM 16, a RAM 17, a communication unit 18, a recording unit 19, an operating unit 20, a display unit 21, and an image acquiring unit 22. The CPU 15 controls the multipurpose machine 3 overall. More specifically, the CPU 15 controls the RAM 17, the communication unit 18, the recording unit 19, the operating unit 20, the display unit 21, and the image acquiring unit 22 in accordance with the programs stored in the ROM 16. The ROM 16 stores programs that perform recording (printing) processing or processing for notifying the state of the multipurpose machine 3 to the PC 1 in accordance with the control exerted by the printer driver 70 provided in the PC 1. The ROM 16 also stores programs that perform processing for acquiring an image from the image acquiring unit 22 provided in the multipurpose machine 3 or processing for conveying the acquired image to the PC 1 in accordance with the control exerted by the scanner driver 50 provided in the PC 1. Furthermore, the ROM 16 stores in advance the IHV-made driver (first driver) that corresponds to each of the printer 122 and the scanner 121 that are the information equipment provided in the multipurpose machine 3. The RAM 17 temporarily stores print data that is transmitted from the PC 1 and is printed by the recording unit 19. The RAM 17 may temporarily store the image data acquired by the image acquiring unit 22.

The communication unit 18 includes a connection port for the network 4. The communication unit 18 controls communication over Ethernet (registered trademark). The recording unit 19 includes a recording unit having an inkjet type recording head, color inks, a carriage, a recording paper transport mechanism, and the like, and an electrical circuit having an ASIC or the like for generating a printing pulse at a recording head based on print data. When a user of the PC 1 provides a print instruction using an application that can print, the display content (image data) of a file opened by the application is temporarily stored as an EMF-format spool file in the HDD 1202 of the PC 1. The stored spool file is converted into print data including the control commands for the multipurpose machine 3 via the printer driver 70, and then is sent to the multipurpose machine 3 via the network 4. The communication unit 18 provided in the multipurpose machine 3 receives the print data, and the recording unit 19 converts the print data into printing pulses to thereby print it on a recording paper. The operating unit 20 includes various buttons such as a power button, a reset button, and the like. A user can operate the multipurpose machine 3 by pushing various buttons provided in the operating unit 20. The display unit 21 includes a liquid crystal display employing, for example, a touch panel. The display unit 21 can display the state of the multipurpose machine 3 or display and input various settings. The image acquiring unit 22 acquires image data via the scanner 121. For this purpose, the image acquiring unit 22 has a CIS type or a CSS type scan head.

FIG. 3 is a diagram illustrating an example of the software configuration of a PC. The PC 1 includes an Ethernet (registered trademark) control stack 92 that controls Ethernet (registered trademark), an IP Network control stack 91 that controls IP (Internet Protocol) Network, and a WSD control stack 90 that controls WSD. The PC 1 also includes an IHV native protocol control stack 89 that controls an IHV specific protocol. Furthermore, the PC 1 includes, for example, a PnPX control module 88 that controls PnPX, i.e., performs the plug-and-play to thereby recognize a connection of a device to the network 4. The PnPX control module 88 recognize a connection of a device in accordance with instructions from the OS. Specifically, each of the OS and the PnPX control module 88 functions as a device recognition unit configured to recognize a connection of a device (the multipurpose machine 3 or the like) to the network 4 via the network 4. PnPX is an abbreviation for Plug and Play Extensions. As a series of extension functions of plug-and-play for providing support for a network connection information equipment, the PnPX is a standard function that is pre-installed in the Windows (registered trademark) Vista OS. In the following description, the PnPX control module 88 executes control using, for example, an N-PnP which is a kind of the PnPX.

The PC 1 also includes information equipment driver group 85. The information equipment driver group 85 includes a standard driver group 87 that is preinstalled as standard in the OS and an IHV-made driver (group) 86 that can be provided from the IHV. The IHV-made driver 86 is a driver that corresponds to any device capable of being connected to the network 4 and information equipment provided in the device, and is stored in advance in a predetermined storage unit of the PC 1. The IHV-made driver may be an OS-provided driver or a full specification driver. A FinishInstall action (hereinafter also referred to as "post-processing") is packaged in the IHV-made driver 86. The FinishInstall action is an action that is pre-defined in the setting file of the IHV-made driver 86 to be installed on the PC 1 by the control of the PnPX. When the OS confirms that the FinishInstall action is defined in the setting file of the installed IHV-made driver, the OS provides instructions to the IHV-made driver 86 to cause it to execute driver post-processing. Driver post-processing is processing for acquiring a supplement installer from the IHV Web server 100.

More specifically, the OS transmits a DIF_FINISHINSTALL_ACTION message, i.e., a message that orders execution of post-processing, to the THY-made driver. When the IHV-made driver 86 receives the DIF_FINISHINSTALL_ACTION message, the IHV-made driver 86 executes driver post-processing. Note that the post-processing is not necessarily packaged in the IHV-made driver 86. In the present embodiment, it is assumed that post-processing is packaged in the setting file of a printer driver. The FinishInstall action described above is disclosed in the following reference document 1. Reference document 1: FinishInstall action of information equipment for Windows Vista, URL: https://www.microsoft.com/japan/whdc/driver/install/Finish_Install.mspx Also, the PC 1 includes an API/DDI 84. API is an abbreviation for Application Programming Interface. DDI is an abbreviation for Device Driver Interface. The API/DDI 84 passes, for example, the event of WSDiscovery, to be described below with reference to FIG. 5, to a network monitor (NM) 80. The NM 80 acquires information about the information equipment provided in a device (the multipurpose machine 3) to be described below with reference to FIG. 6 via the API/DDI 84. Also, the NM 80 displays a screen shown in FIGS. 4-A to 4-C via the API/DDI 84. The application 30 is an application that can issue a print instruction or a scan instruction. The OS may have the application 30 bundled or the PC 1 may acquire the application 134 from the IHV-made Web server 100, and thereby install the application 134 as the application 30 on the OS. Among the modules included in the software configuration of the PC described above, the IHV native protocol control stack 89 and the IHV-made driver 86 are IHV-made modules, the modules other than these are modules that are preinstalled as standard in the OS.

FIGS. 4-A to 4-C are diagrams illustrating examples of the screens displayed by the NM 80. As shown in FIG. 4-A, the NM 80 displays PCs and peripheral devices that are present on the network 4. In FIG. 4-A, reference numeral 42 denotes an icon that represent the PC 1. FIGS. 4-B and 4-C are diagrams illustrating another examples of the screens displayed by the NM 80. For example, when the multipurpose machine 3 is connected to the network 4, the multipurpose machine 3 transmits the WSDiscovery message as shown in FIG. 5 to all of the equipment on the network 4 with the aid of the function of the WSD. The WSDiscovery message is information indicating that the multipurpose machine 3 is participating on the network 4. When the NM 80 receives the WSDiscovery message, the NM 80 displays an icon 43 representing the multipurpose machine 3 on the screen as shown in FIG. 4-B. When a user specifies the icon 43 using a mouse, the NM 80 displays an install menu 51 on the screen as shown in FIG. 4-C. When a user selects the install menu 51, the OS installs a printer driver that corresponds to the printer 122 provided in the multipurpose machine 3 and a scanner driver, i.e., the IHV-made driver that corresponds to the scanner 121 provided in the multipurpose machine 3 via plug-and-play. More specifically, the OS stores (installs) the IHV-made drivers, which correspond to each of the printer 122 and the scanner 121 both stored in the storage unit of the PC 1, in the other storage area that is different from the storage area in which these IHV-made drivers are initially stored. In other words, when it is recognized that a connection of a device to the network 4 has been made, the OS functions as a first installation unit configured to install a first driver, which corresponds to the information equipment provided in the device, on an information processing apparatus.

FIGS. 6 and 7 are diagrams illustrating information about the information equipment provided in the multipurpose machine. The information is issued from the multipurpose machine upon the execution of the PnPX by the OS. When the OS of the PC 1 executes the PnPX, the OS of the PC 1 queries information about the information equipment provided in the multipurpose machine 3 with respect to the multipurpose machine 3. In response to the query, the multipurpose machine 3 issues information about the information equipment, which is shown in FIGS. 6 and 7, to the PC 1. FIG. 6 is a diagram illustrating an example of information about the printer 122 provided in the multipurpose machine 3. Reference numeral 90 shown in FIG. 6 denotes information equipment category element of the PnPX. In this example, the information equipment category element 90 represents the category of the printer 122. FIG. 7 is a diagram illustrating an example of information about the scanner 121 provided in the multipurpose machine 3. Reference numeral 91 shown in FIG. 7 denotes information equipment category element of the PnPX. In this example, the information equipment category element 91 represents the category of the scanner 121. The OS of the PC 1 determines an THY-made driver (first driver) to be installed on the basis of the issued information about the information equipment.

FIGS. 8-A and 8-B are diagrams illustrating an example of the configuration of a supplement installer and the full specification driver table, respectively. FIG. 8-A is a diagram illustrating an example of the configuration of a supplement installer. The additional installer 131 functions as a second installation unit configured to install a second driver, which enables the functions of the device to be used, on the PC 1. In the first embodiment, the second driver is a full specification driver that enables all of the functions of the information equipment provided in the device to be used. The additional installer 131 includes an installation processing unit 201, a software downloading unit 202, and a full specification driver table 203. The software downloading unit 202 downloads software (e.g., driver). The installation processing unit 201 installs the downloaded software. The full specification driver table 203 is a table in which information about the full specification driver corresponding to the information equipment provided in the device is set.

FIG. 8-B is a diagram illustrating an example of the full specification driver table.

The full specification driver table 203 has data structures such as a machine name, a device type, a driver name, and a download URL. The machine name is the machine name of the device or the machine name of the information equipment provided in the device. The device type is the type of the device or the type of the information equipment provided in the device. The driver name is a full specification driver required for using the functions of the device or the information equipment shown by the machine name. The download URL is the positional information about the full specification driver corresponding to the driver name. More specifically, the download URL is the positional information about the full specification driver provided in the IHV Web server 100.

Figure 9:
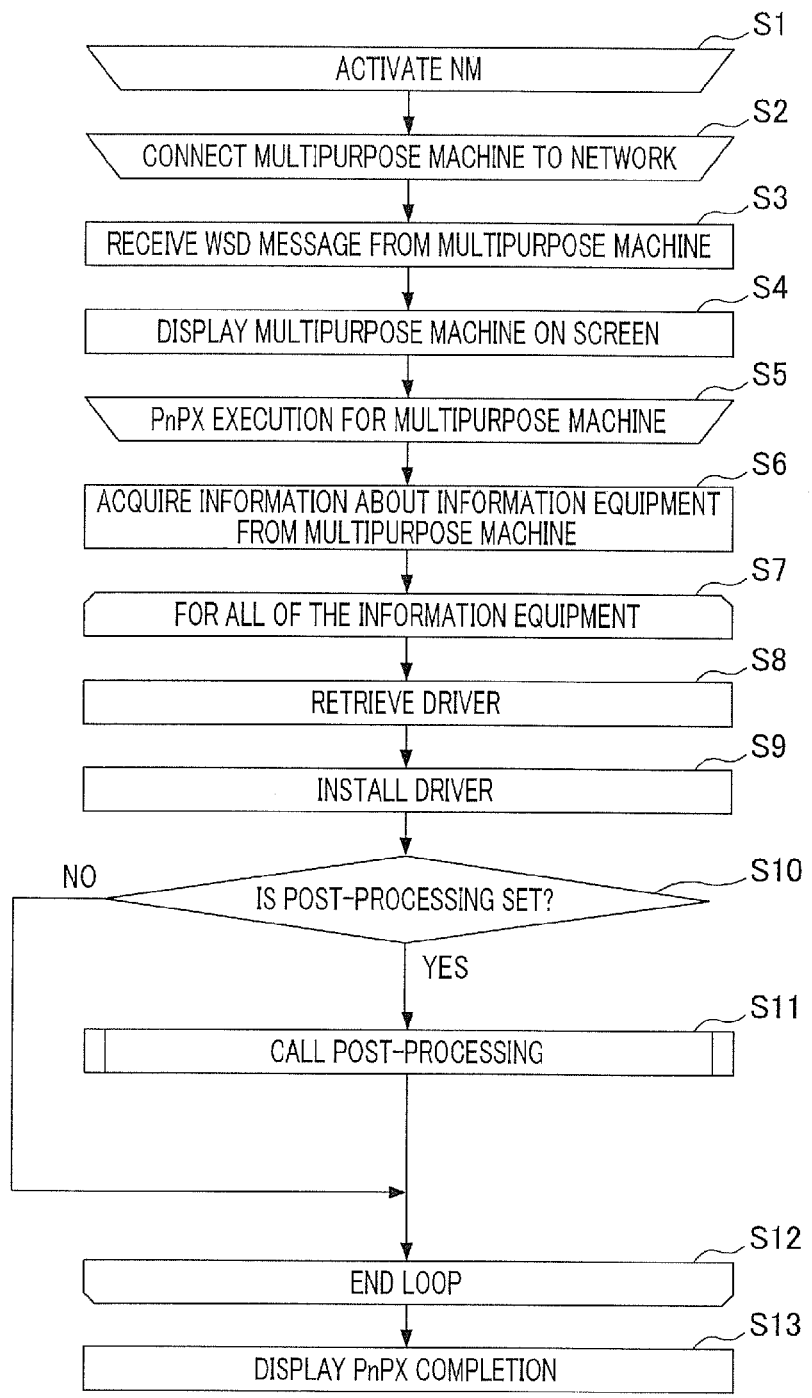
FIG. 9 is a diagram illustrating an example of the entire operation processing flow performed by a PC.

FIG. 9 is a diagram illustrating an example of the entire operation processing flow performed by a PC. First, a user activates the NM 80 of the PC 1 (step S1). The NM 80 displays the list of information equipment connected to the network 4 on a network monitor. A user connects the multipurpose machine 3 to the network 4 (step S2). Since the multipurpose machine 3 transmits the WSDiscovery message (WSD message) shown in FIG. 5 to the PC 1, the OS of the PC 1 receives the WSD message (step S3). Next, the NM 80 displays the icon 43 (see FIG. 4-B) denoting the multipurpose machine 3 on the screen in accordance with the instruction from the OS (step S4).

When a user specifies the icon 43 by operating the mouse, the NM 80 displays an install menu 51 (see FIG. 4-C) on the screen. When a user selects the install menu 51, the OS and the PnPX control module 88 start the execution of the PnPX for the multipurpose machine 3 (step S5). In other words, the OS that functions as a first installation unit installs a first driver corresponding to the multipurpose machine 3 via plug-and-play. Note that the OS may automatically start the execution of the PnPX for the multipurpose machine 3 upon connection of the multipurpose machine 3 to the network 4 without causing the NB 80 to display the icon 43 denoting the multipurpose machine 3 on the screen. When the execution of the PnPX is started, the OS provides instructions for acquiring information about the information equipment provided in the multipurpose machine 3 with respect to the multipurpose machine 3 using the function of the WSD, and thus acquires information about the information equipment as shown in, for example, FIGS. 6 and 7 from the multipurpose machine 3 that has responded to the instruction (step S6).

The PC 1 executes the processes in steps S8 to S11 to be described below for all of the information equipment that corresponds to information about the information equipment acquired in step S6 (steps S7 and S12). The OS of the PC 1 recognizes that the multipurpose machine 3 includes two pieces of information equipment that is a printer and a scanner based on information about the information equipment shown in, for example, FIGS. 6 and 7. Therefore, the OS executes the processes in steps S8 to S11 for each of the recognized printer and scanner as the target information equipment.

The OS of the PC 1 retrieves an IHV-made driver for the target information equipment (step S8). When the IHV-made driver is present as a result of retrieval, the OS of the PC 1 installs the IHV-made driver as a first driver (step S9). Since the first driver is preinstalled in the OS, the first driver is a driver (driver for providing OS or OS-provided driver), for being provided to the OS, for which a reduced volume or limitations on interfaces with the functions of the OS have been set. Subsequently, the OS determines whether or not post-processing is defined in the setting file of the installed IHV-made driver (step S10). When post-processing is not defined in the setting file of the IHV-made driver, the loop is ended (step S12). When post-processing is defined in the setting file of the IHV-made driver, the OS calls post-processing (step S11). More specifically, the OS notifies the IHV-made driver about the DIF_FINISHINSTALL_ACTION to thereby cause the IHV-made driver to install the supplement installer 131. When the processing for all of the information equipment has ended, the loop is ended (step S12). Then, the OS displays information indicating that the PnPX has been completed (step S13).

Figure 10:
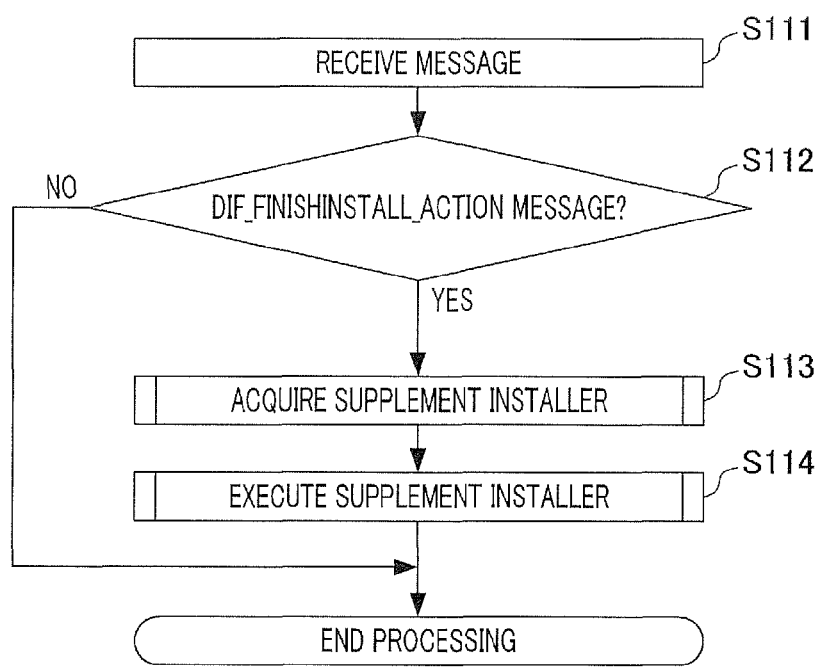
FIG. 10 is a flowchart illustrating call processing for post-processing.

FIG. 10 is a flowchart illustrating call processing for post-processing in step S11 shown in FIG. 9. The IHV-made driver receives a message from the OS (step S111). The IHV-made driver determines whether or not the received message is DIF_FINISHINSTALL_ACTION (step S112). When the received message is not DIF_FINISHINSTALL_ACTION, the process is ended (step S115). When the received message is the DIF_FINISHINSTALL_ACTION message, the IHV-made driver acquires the supplement installer 131 from the IHV Web server 100 via the network 4 (step S113). Subsequently, the THY-made driver executes the acquired additional installer 131 (step S114), and the process is ended. Upon the execution of the supplement installer 131, the IHV-made driver conveys the machine names of the target information equipment to the supplement installer 131.

As described with reference to FIGS. 9 and 10, the first installation unit (OS) acquires a second installation unit configured to install a second driver, which enables the functions of the device to be used, on the PC 1 upon installation of the first driver on the PC 1.

Figure 11:
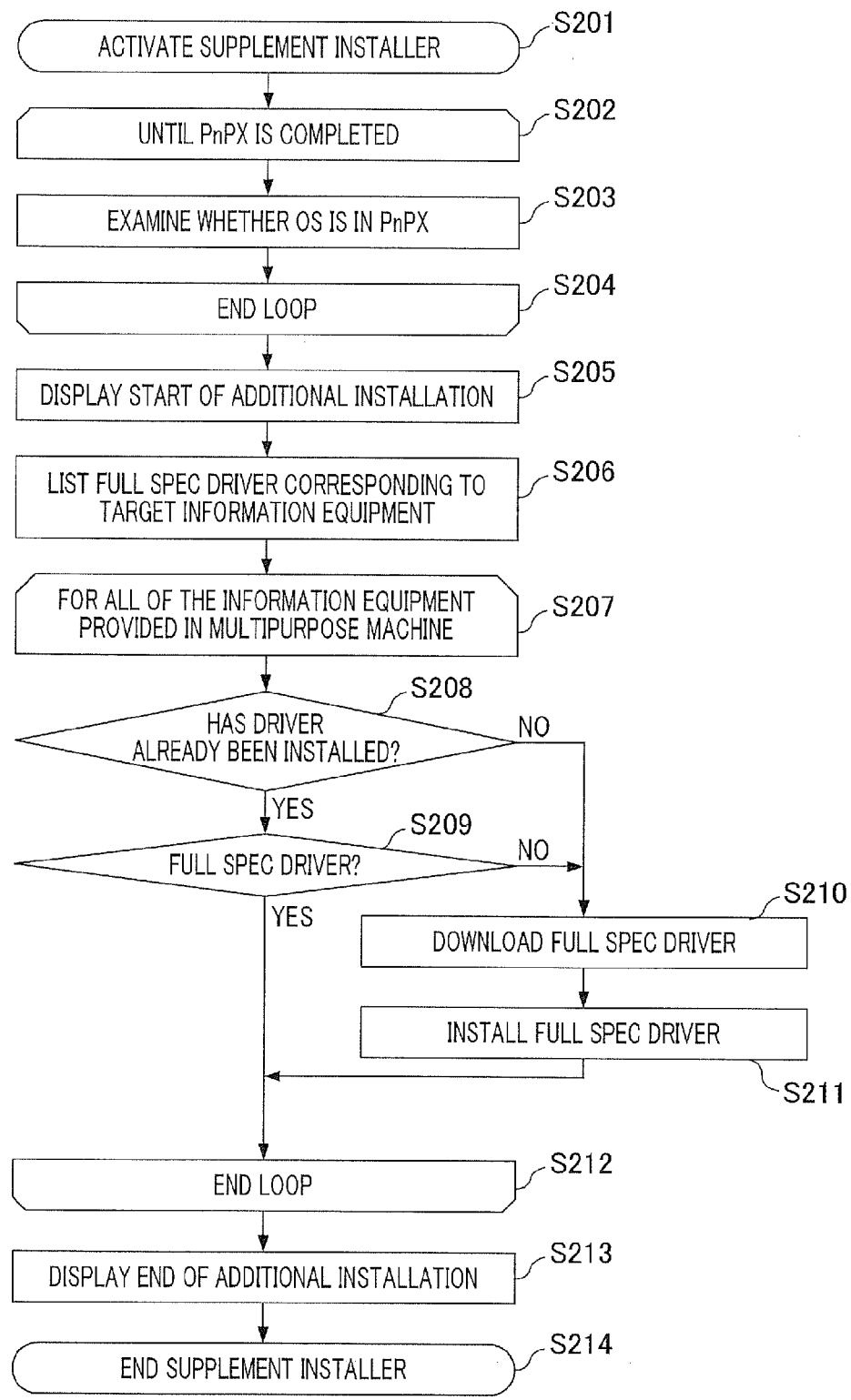
FIG. 11 is a flowchart illustrating processing for executing a supplement installer.

FIG. 11 is a flowchart illustrating the processing for executing a supplement installer in step S114 shown in FIG. 10. When the supplement installer 131 is activated (step S201), the supplement installer 131 receives the machine names of the target information equipment from the IHV-made driver. Subsequently, in the loop from step S202 to step S204, the supplement installer 131 stands by until the OS is not carrying out PnPX. More specifically, the supplement installer 131 makes a query to the OS to examine whether or not the OS is carrying out PnPX (step S203), and stands by until the OS is not carrying out PnPX. By means of this processing, the process advances to processing subsequent to step S205 after the PnPX for all of the information equipment is ended. Consequently, all of the drivers (first drivers) of the information equipment, which can be installed on the OS, are temporarily installed thereon.

Next, the supplement installer 131 displays that a supplement installation is to be started (step S205). The additional installation is to install a second driver, which enables the functions of the information equipment to be used, in addition to the installed first driver (see step S9 in FIG. 9). Subsequently, the supplement installer 131 lists the full specification drivers corresponding to the target information equipment based on the full specification driver table shown in FIG. 13-B and the machine names of the target information equipment (step S206). The machine names have been conveyed to the supplement installer 131 upon activation thereof.

Next, the supplement installer 131 executes the processes in steps S208 to S212 for all of the target information equipment provided in the multipurpose machine 3 (step S207). First, as described below, the supplement installer 131 determines whether or not a full specification driver needs to be installed on the PC 1 by executing the processes in steps S208 and S209. For any information equipment, the supplement installer 131 examines whether or not a first driver corresponding to the information equipment has already been installed on the PC 1 (step S208). When the first driver corresponding to the information equipment has already been installed, the supplement installer 131 determines whether or not the first driver corresponds to a full specification driver, which has been listed in step S206, corresponding to the information equipment (step S209).

When the first driver corresponds to the full specification driver, the process advances to step S212 and the loop is ended. When the first driver does not correspond to the full specification driver, the supplement installer 131 determines that the full specification driver needs to be installed on the PC 1. Then, the supplement installer 131 refers to the full specification driver table shown in FIG. 8-B to thereby acquire a download URL corresponding to the full specification driver. Then, the supplement installer 131 downloads the full specification driver from the THY Web server 100 based on the acquired download URL (step S210).

When the supplement installer 131 determines in step S208 that the first driver has not been installed on the PC 1, the supplement installer 131 determines that the full specification driver needs to be installed on the PC 1, and the process advances to step S210. Subsequently, the supplement installer 131 installs the downloaded full specification driver (step S211), and the loop is ended (step S212). This full specification driver is a driver of which the functions are not limited compared to that of the aforementioned first driver. Hence, many functions can be employed by the full specification driver. When the entire of the loop has ended, the supplement installer 131 displays that additional installation has been completed (step S213), and the process is ended.

The aforementioned information processing apparatus of the first embodiment installs a first driver corresponding to a device upon execution of the PnPX for the device connected to the network 4 and executes the following processing as well. The additional installer 131 of the information processing apparatus determines whether or not the full specification driver of the information equipment provided in the device has already been installed, and determines whether or not a second driver (full specification driver) needs to be installed based on the determination result. Then, when the supplement installer 131 determines that the second driver needs to be installed, the supplement installer 131 installs the second driver on the information processing apparatus via the network 4. Therefore, according to the information processing apparatus, through execution of the PnPX for the device, the full specification drivers of all of the information equipment provided in the device can be installed. The installation method of the present embodiment is realized by the function of the supplement installer 131. The installation method is executed in post-processing after driver installation in response to a connection of the device to a network. The installation method includes a determination step of determining whether or not the installed driver is a full specification driver. The installation method also includes an installation step of installing a full specification driver when the determination step determines that the installed driver is not a full specification driver. Also, the computer program of the present embodiment may be a program that realizes the installation method.

Next, a description will be given of a second embodiment. The overall operation processing performed by the information processing apparatus of the second embodiment is similar to the operation processing described with reference to FIG. 9. Also, call processing for post-processing to be executed by the information processing apparatus of the second embodiment is similar to call processing for post-processing described with reference to FIG. 10. Note that in the second embodiment, the IHV Web server 100 includes a supplement installer 132 that has a function different from that of the supplement installer 131. Therefore, in steps S113 and S114 shown in FIG. 10, the OS acquires the supplement installer 132 for execution. Also, in the second embodiment, a principal driver to be described below is a second driver.

Figure 12:
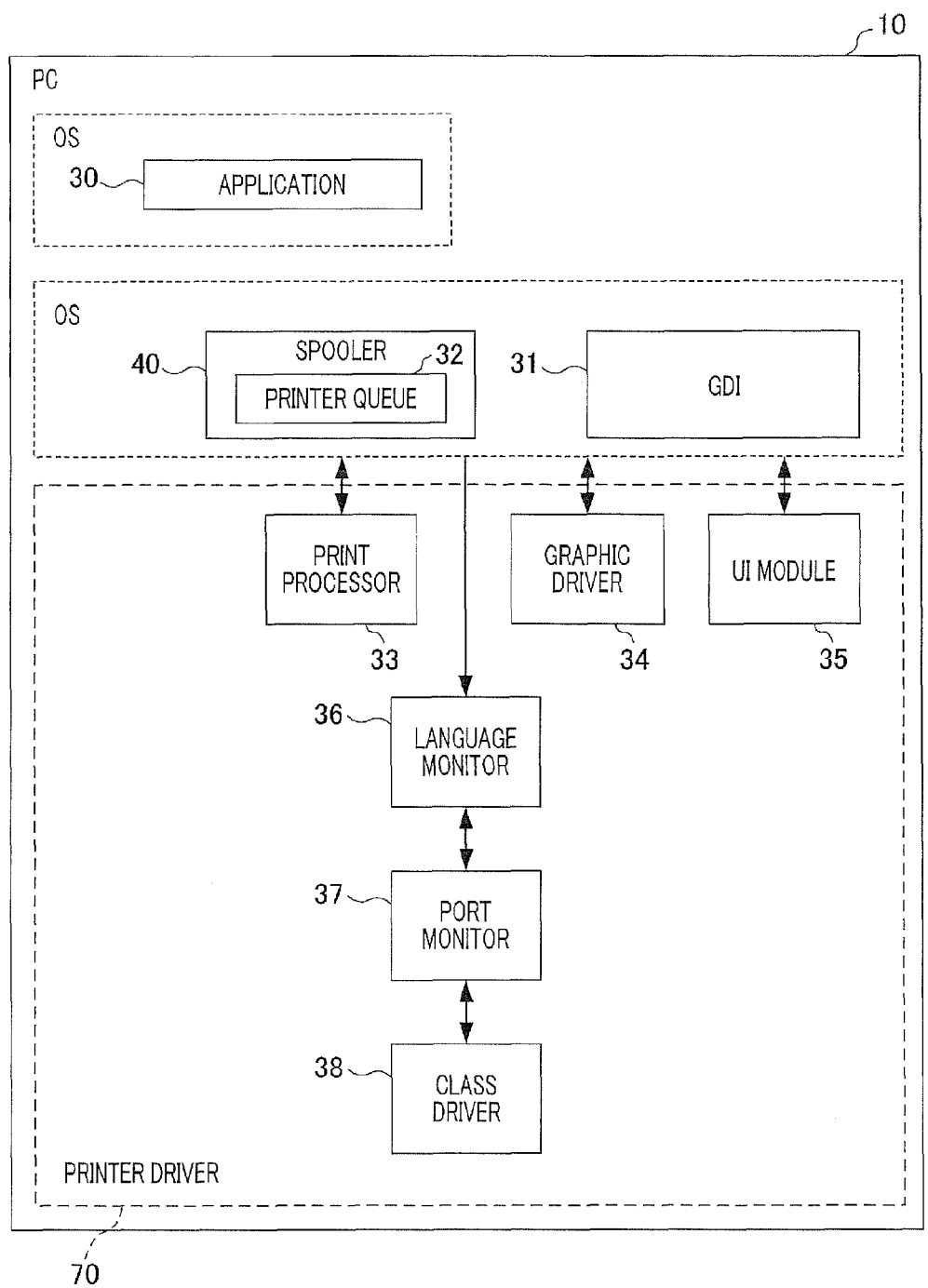
FIG. 12 is a diagram illustrating an example of the configuration of an information processing apparatus according to a second embodiment.

FIG. 12 is a diagram illustrating an example of the configuration of an information processing apparatus according to a second embodiment. The PC 10 is the information processing apparatus of the second embodiment. The basic configuration of the PC 1 is the same as that of the information processing apparatus of the first embodiment (the PC 1). The printer driver 70 provided in the PC 10 includes a plurality of modules denoted by reference numerals 33 to 38. A print processor 33 executes a change in print layout and special processing for a print image. Based on a drawing command sent from a GDI 31, a graphics driver 34 performs printing image processing to thereby generate print control commands. A UI module 35 provides and controls the user interface of a printer driver. A language monitor 36 is a data communication I/F (Interface), and controls transmission/reception of data. A port monitor 37 receives data transmitted from the language monitor 36 and transmits it to an appropriate port, or receives data transmitted from the multipurpose machine 3 via a class driver 38. The class driver 38 is a low-level module which is the closest to the port. The printer driver 70 according to the present embodiment corresponds to a printer class driver for a specific protocol such as WSD or IHV, and controls the port (in the present embodiment, a network port). The configuration of the printer driver 70 is the same as that of any one of an OS standard driver, an OS-provided driver, or a full specification driver.

The application 30 is an application that is capable of issuing a print instruction. The application 30 corresponds to, for example, the Notepad text editor (Notepad.exe) or the like which is preinstalled as standard in the OS. GDI (Graphics Device Interface) 31 has a function that receives a print command. Note that a printer driver that can receive a print command via the GDI refers to a GDI printer driver. A printer queue 32 queues a print job. The printer queue 32 is provided in a spooler 40. The queued print job is displayed on a printer queue folder (not shown).

FIGS. 13-A and 13-B are diagrams illustrating examples of the configurations of a supplement installer and a driver component table according to the second embodiment, respectively. The additional installer 132 shown in FIG. 13-A is a supplement installer according to the second embodiment. The additional installer 132 includes a installation processing unit 201, a software downloading unit 202, a driver component table 204, a driver function list table 205, and an application function table 206. The installation processing unit 201 and the software downloading unit 202 are respectively the same as the installation processing unit 201 and the software downloading unit 202 both provided in the supplement installer 131 shown in FIG. 8-A.

The driver component table 204 is a table in which information about the driver component is set. The driver component is a component that operates in combination with the driver. For example, the port monitor 37 or the like shown in FIG. 12 corresponds to the driver component. The driver function list table 205 is a table in which information about the driver that corresponds to the information equipment included in the device is set. The application function table 206 is a table in which information about information equipment, a driver, and an output port that are required for the execution of an application.

FIG. 13-B is a diagram illustrating an example of the driver component table 204. The driver component table 204 has a data configuration such as a driver component name, a corresponding information equipment type, a corresponding driver type, a corresponding driver port, and URL. The driver component name is the name of a driver component. The corresponding information equipment type is the type of information equipment that corresponds to the driver component. The corresponding driver type is the type of a driver corresponding to the driver component. The corresponding driver port is an output port that corresponds to the driver component. The URL is the positional information for the driver component. More specifically, the URL indicates the positional information for the driver component in the IHV Web server 100 (see FIG. 1).

FIGS. 14-A and 14-B are diagrams illustrating examples of the driver function list table and the application function table, respectively. FIG. 14-A is a diagram illustrating an example of the driver function list table 205. The driver function list table 205 has data configuration such as a machine name, information equipment type, a driver type, a driver name, an output-capable port, priority, and URL. The machine name is the machine name of the device. The information equipment type is the type of information equipment provided in the device. The driver name is the name of a driver that is required for employing the function of the information equipment. The output-capable port is an output port that corresponds to the driver. Priority is the priority for the drivers. Priority is determined in advance. Priority corresponds to the priority order relating to, for example, driver installation. The smaller the number set as the priority becomes, the higher the priority, i.e., the priority order, becomes. The URL is the positional information for each driver. More specifically, the URL indicates the positional information for each driver in the IHV Web server 100.

FIG. 14-B is a diagram illustrating an example of the application function table 206. The application function table 206 has a data configuration such as an application name, a principal information equipment type, a principal driver type, and a principal output port. The application name is the name of an application. The principal information equipment type is the type of information equipment (principal information equipment) required for the execution of the application. The principal driver type is the type of a driver (principal driver) that is required for employing the function of the principal information equipment. The principal output port is an output port (principal output port) that corresponds to the principal driver.

Figure 15:
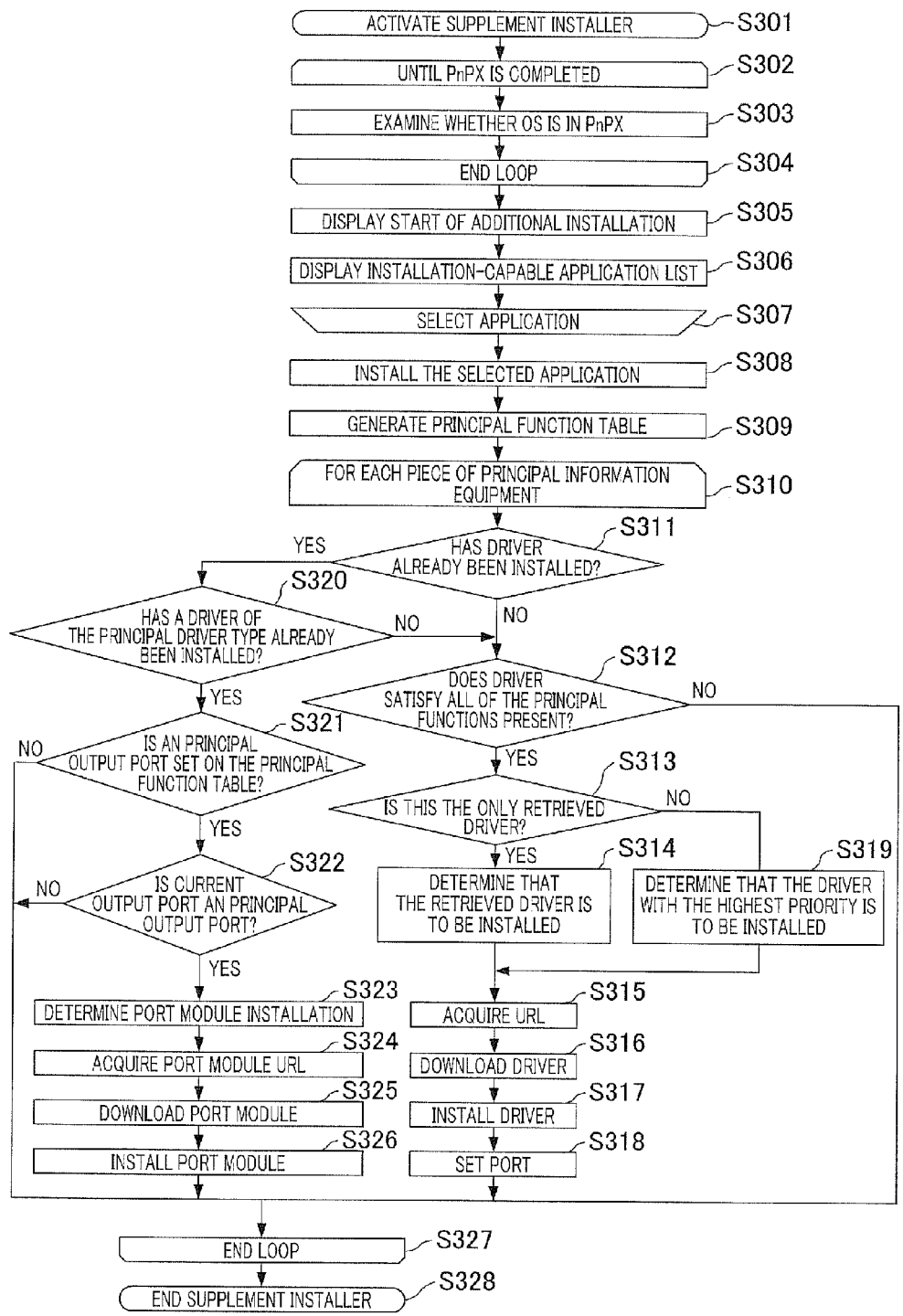
FIG. 15 is a flowchart illustrating processing for executing a supplement installer.

FIG. 15 is a flowchart illustrating processing for executing a supplement installer according to the second embodiment. The processes in steps S301 to S305 shown in FIG. 15 are the same as those in steps S201 to S205 shown in FIG. 11. In the second embodiment, the supplement installer 132 functions as a second installer. In step S306, the supplement installer 132 displays an installable application list (step S306). The installable application list is a list of applications that can be installed on the PC 10. Subsequently, when the supplement installer 132 selects an application in accordance with a user's operation input (step S307), the supplement installer 132 installs the selected application on the PC 10 (step S308).

Next, the supplement installer 132 generates a principal function table for each installed application using the application function table 206 (step S309). The principal function table is a table that indicates the function (principal function) required for the execution of the installed application. For example, assume the case where all of a photo print application A, a photo print application B, and a scan assistance application C shown in the application function table 206 of FIG. 14-B are installed. The additional installer 132 refers to the application function table 206 shown in FIG. 14-B to thereby generate the principal function table as shown in FIG. 16.

The principal function table shown in FIG. 16 has a data configuration such as a principal information equipment type, a principal driver type, and a principal driver port. The principal information equipment type is the type of information equipment required for the execution of the installed application. The principal driver type is the type of a driver (principal driver) that is required for employing the functions of the information equipment. The principal driver port is an output port (principal output port) that corresponds to the driver. In other words, the principal function table indicates the corresponding information among principal information equipment required for the execution of an application, a principal driver required for the execution of the application, and a principal output port required for the execution of the application. Hereinafter, the principal information equipment type, the principal driver type, and the principal driver port, which are listed in the principal function table, are also referred to as an "principal function".

Referring back to FIG. 15, the supplement installer 132 refers to the principal function table generated in step S309, and executes the following processing for each piece of principal information equipment (step S310). The additional installer 132 determines whether or not a driver corresponding to the target information equipment has been installed on the PC 10 (step S311). When a driver corresponding to the target information equipment has not been installed on the PC 10, the supplement installer 132 retrieves the driver function list table 205 and determines whether or not there is a driver that satisfies all of the principal functions corresponding to the target information equipment in the principal function table (step S312). As a result of retrieval, when there is no driver that satisfies all of the principal functions corresponding to the target information equipment in the principal function table, the loop is ended (step S327). In this way, execution processing for executing a supplement installer is ended (step S328). When there is a driver that satisfies all of the principal functions corresponding to the target information equipment in the principal function table, the process advances to step S313. Note that in step S312, the supplement installer 132 may determine whether or not a driver (e.g., a principal driver corresponding to a principal driver type) that satisfies a part of the principal function is present in a driver function list 205.

Next, the supplement installer 132 determines whether or not only one driver has been obtained as a result of retrieval in step S312 (step S313). When only one driver has been obtained as a result of retrieval, the supplement installer 132 determines that the obtained driver is to be installed (step S314), and the process advances to step S315. When a plurality of drivers has been obtained as a result of retrieval, the supplement installer 132 refers to the driver function list table 205, and determines from the plurality of obtained drivers that the driver with the highest priority is to be installed (step S319). Then, the process advances to step S315.

Next, the supplement installer 132 acquires an URL, which corresponds to the driver determined to be installed, based on the driver function list table 205 (step S315). The additional installer 132 downloads the driver from the URL acquired in step S315 (step S316). The additional installer 132 installs the downloaded driver. Then, the supplement installer 132 sets an output port to a principal driver port corresponding to the target information equipment in the principal function table (step S318), and the process advances to step S327.

When the driver corresponding to the target information equipment has already been installed on the PC 10 as a result of determination processing in step S311, the supplement installer 132 executes the following processing. The additional installer 132 determines whether or not a driver of the principal driver type, which corresponds to the target information equipment in the principal function table, has already been installed on the PC 10 (step S320). When a driver of the principal driver type has not been installed on the PC 10, the process advances to step S312. When a driver of the principal driver type has already been installed on the PC 10, the process advances to step S321.

Next, the supplement installer 132 determines whether or not a principal driver port (principal output port) corresponding to the target information equipment is set in the principal function table (step S321). When a principal driver port corresponding to the target information equipment is not set in the principal function table, the process advances to step S327. When a principal driver port corresponding to the target information equipment is set in the principal function table, the process advances to step S322.

Next, the supplement installer 132 determines whether or not an output port, which is currently set on the PC 10 as an output port corresponding to the installed driver, is a principal output port (step S322). When the set output port is a principal output port, the process advances to step S327. When the set output port is not a principal output port, the supplement installer 132 determines that a principal output port corresponding to the target information equipment is absent on the PC 10, the process advances to step S327.

In step S327, the supplement installer 132 determines that a port module for realizing a principal output port is to be installed (step S323). More specifically, the supplement installer 132 refers to the driver component table 204 as shown in FIG. 13-B, and determines that a port monitor corresponding to the principal output port is to be installed. Also, the supplement installer 132 refers to a driver component table, and acquires the URL of the port module that is determined to be installed (step S324). Subsequently, the supplement installer 132 downloads the port module from the acquired URL (step S325). Then, the supplement installer 132 installs the downloaded port module (step S326), and the process advances to step S327.

The aforementioned information processing apparatus of the second embodiment installs a first driver corresponding to a device upon execution of the PnPX for the device connected to the network 4 and executes the following processing as well. The additional installer 132 provided in the information processing apparatus determines whether or not a principal driver, which corresponds to the principal information equipment required for the execution of the selected application, has already been installed on the information processing apparatus (steps S311 and S320). When a principal driver, which corresponds to the principal information equipment for the information processing apparatus, has not been installed, the supplement installer 132 installs the principal driver via the network 4. Therefore, according to the information processing apparatus, the principal drivers for all of the information equipment required for the execution of the selected application can be installed upon execution of the PnPX.

Also, the supplement installer 132 installs a principal driver that has been selected from among the principal drivers in accordance with a predetermined priority for driver installation, when the principal driver has not yet been installed on the PC 10 (steps S319 and S317). Therefore, according to the information processing apparatus of the second embodiment, a principal driver with the first priority order can be installed on all of the information equipment required for the execution of the selected application upon execution of the PnPX.

Also, when a principal driver has already been installed on the PC 10, the supplement installer 132 determines whether or not a principal output port, which is associated with the principal driver in the principal function table, is present on the PC 10 (steps S321 and S322). Then, when there is a principal output port, which is associated with the principal driver, is absent on the PC 10, the supplement installer 132 installs an unit (port module) configured to realize the principal output port (step S326). Therefore, according to the information processing apparatus of the second embodiment, a principal output port, which corresponds to a principal driver required for the execution of the selected application, can be set upon execution of the PnPX.

According to the information processing apparatus of the present invention described above, a driver, which enables the function of a device to be used, can be installed on the information processing apparatus upon execution of the PnPX for a device connected to network. Therefore, for example, a user can install the full specification driver for the device on the information processing apparatus via plug-and-play without looking for the driver for the device which the user wishes to use.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-053951 filed Mar. 11, 2010, which is hereby incorporated by reference herein in its entirety.

The invention claimed is:

1. An information processing apparatus capable of communicating with external apparatuses, the information processing apparatus comprising:
   a device recognition unit configured to recognize a connection of a device to a network;
   a retrieval unit configured to retrieve a first driver, which corresponds to the device, on the information processing apparatus when the connection of the device to the network is recognized,
   a determination unit configured to determine whether or not information to acquire a second driver which has more function than the first driver is included in the first driver; and
   an acquiring unit configured to acquire the second driver from the external apparatuses when it is determined that the information is included in the first driver.

2. The information processing apparatus according to claim 1, wherein, when the second driver has not been installed on the information processing apparatus, the second driver is installed on the information processing apparatus.

3. The information processing apparatus according to claim 1, further comprising:
   a selecting unit configured to select, when an application to be installed is selected, a function required by the application,
   wherein the acquiring unit acquires the second driver which has the selected function.

4. The information processing apparatus according to claim 3, wherein the acquiring unit acquires the second driver in accordance with a predetermined priority for driver installation, when a plurality of second drivers having the selected function are retrieved.

5. The information processing apparatus according to claim 1, wherein the information included in the first driver is additional instruction commands and is included in a setting file of the first driver.

6. The information processing apparatus according to claim 1, wherein another installer is acquired for acquiring the second driver.

7. The information processing apparatus according to claim 1, wherein the first driver is preinstalled in an operating system.

8. A method for controlling an information processing apparatus capable of communicating with external apparatuses, the method comprising:
   recognizing, in a device recognition step, a connection of a device to a network;
   retrieving, in a retrieval step, a first driver, which corresponds to the device, on the information processing apparatus when the connection of the device to the network is recognized,
   determining, in a determination step, whether or not information to acquire a second driver which has more function than the first driver is included in the first driver; and
   acquiring, in an acquiring step, the second driver from the external apparatuses when it is determined that the information is included in the first driver.

9. A non-transitory storage medium storing a computer-readable program for causing a computer to execute a method for controlling an information processing apparatus capable of communicating with external apparatuses,
wherein the program causes the computer to execute:
recognizing, in a device recognition processing, a connection of a device to a network;
retrieving, in a retrieval processing, a first driver, which corresponds to the device, on the information processing apparatus when the connection of the device to the network is recognized,
determining, in a determination processing, whether or not information to acquire a second driver which has more function than the first driver is included in the first driver; and
acquiring, in an acquiring processing, the second driver from the external apparatuses when it is determined that the information is included in the first driver.

\* \* \* \* \*